United States Patent
Snyder

(10) Patent No.: US 10,218,160 B1
(45) Date of Patent: Feb. 26, 2019

(54) HYBRID ELECTRICAL HARNESS AND METHOD OF MAKING

(71) Applicant: UNITED TECHNOLOGIES CORPORATION, Farmington, CT (US)

(72) Inventor: Ryan K Snyder, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/847,434

(22) Filed: Dec. 19, 2017

(51) Int. Cl.
| | | |
|---|---|---|
| H01B 7/00 | (2006.01) | |
| G01K 1/10 | (2006.01) | |
| H02G 3/04 | (2006.01) | |
| H01R 13/533 | (2006.01) | |
| H01R 9/03 | (2006.01) | |

(52) U.S. Cl.
CPC ........... *H02G 3/0406* (2013.01); *H01R 9/032* (2013.01); *H01R 13/533* (2013.01)

(58) Field of Classification Search
CPC ................................ H01B 7/0208; G01K 1/10
USPC ................. 174/120 R, 137 R, 72 A; 374/179
See application file for complete search history.

(56) References Cited

U.S. PATENT DOCUMENTS

| | | | | |
|---|---|---|---|---|
| 3,548,297 | A * | 12/1970 | Van Geet | G01K 1/14 324/321 |
| 4,460,225 | A | 7/1984 | Moore et al. | |
| 5,012,045 | A | 4/1991 | Sato | |
| 5,456,761 | A * | 10/1995 | Auger | G01K 1/146 136/232 |
| 5,520,461 | A * | 5/1996 | Curry | G01K 1/10 136/232 |
| 6,536,950 | B1 * | 3/2003 | Green | G01K 1/10 374/141 |
| 7,419,402 | B2 | 9/2008 | Carnahan et al. | |
| 7,687,714 | B2 | 3/2010 | Deterre et al. | |
| 9,435,690 | B2 | 9/2016 | Hoffman et al. | |
| 9,466,404 | B2 | 10/2016 | Guthrie | |
| 9,716,374 | B2 | 7/2017 | Rohr et al. | |

* cited by examiner

*Primary Examiner* — Chau N Nguyen
(74) *Attorney, Agent, or Firm* — Snell & Wilmer, L.L.P.

(57) ABSTRACT

Systems and methods are disclosed herein for an electrical harness. The electrical harness may include a high temperature segment, a low temperature segment, and a transition segment between the high temperature segment and the low temperature segment. The electrical harness may include a conductor disposed within the electrical harness.

14 Claims, 4 Drawing Sheets

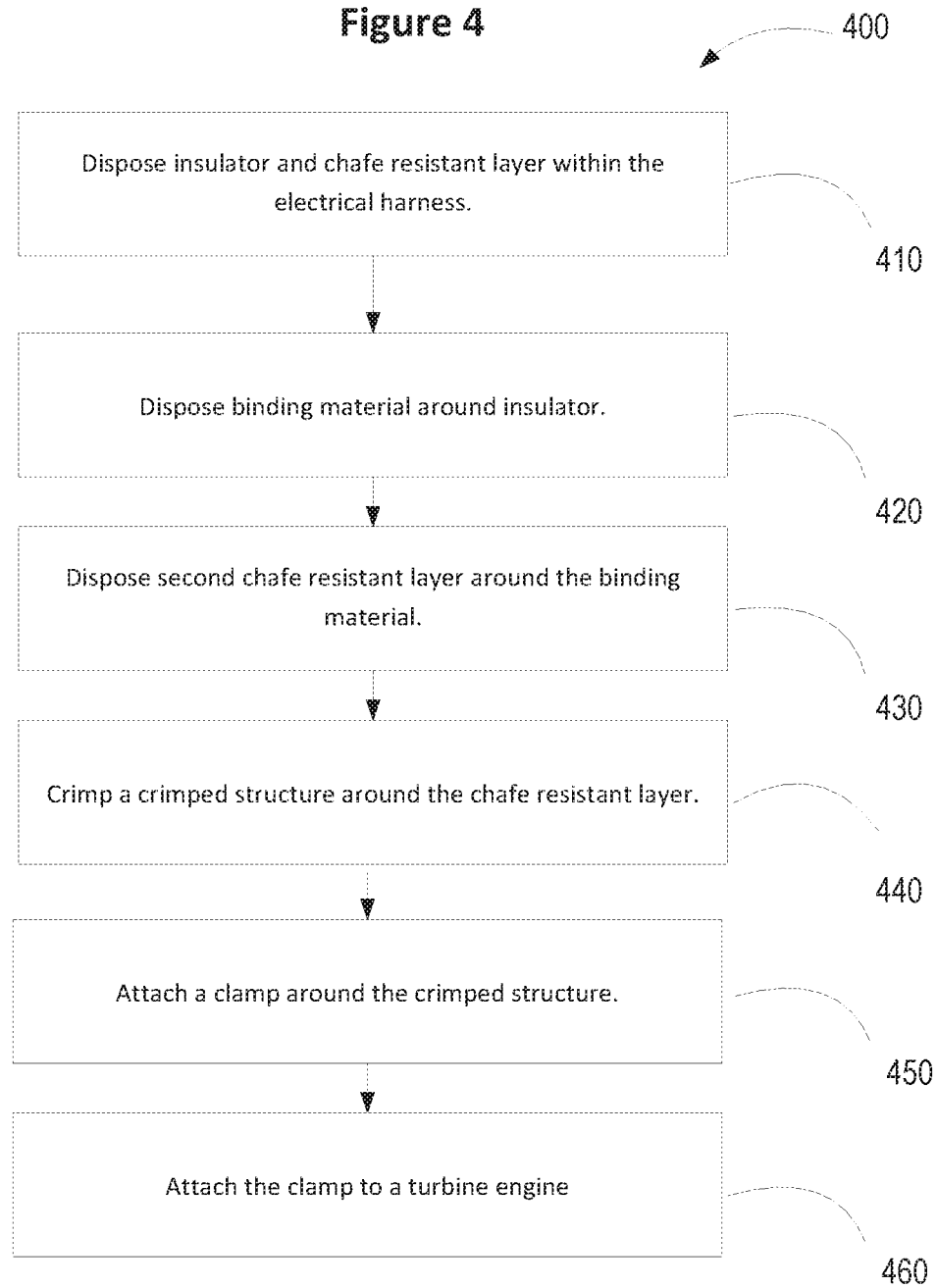

HYBRID ELECTRICAL HARNESS AND METHOD OF MAKING

FIELD

The present disclosure relates generally to electrical harnesses. More particularly, the present disclosure relates to electrical harnesses for low and high temperature applications.

BACKGROUND

A typical gas turbine engine has a substantial number of electrical components. Electrical power, and signals to and from the individual electrical components, is commonly transmitted along conductors. In gas turbine engines, conductors often pass through relatively hot portions of the engine as well as relatively cooler portions of the engine.

SUMMARY

According to various embodiments, an electrical harness is described herein. The electrical harness may include a plurality of segments, such as a high temperature segment, a low temperature segment, and a transition segment between the high temperature segment and the low temperature segment. The electrical harness may include a conductor disposed within the electrical harness. The conductor may continuously span the high temperature segment, the transition segment, and the low temperature segment. The electrical harness may include a first insulator disposed radially outward of the conductor at the high temperature segment and the transition segment. The electrical harness may include a first chafe resistant layer disposed radially outward of the conductor at the low temperature segment and the transition segment. The electrical harness may include a binding material disposed radially outward of the first insulator and the first chafe resistant layer at the transition segment.

According to various embodiments, the electrical harness may include a second chafe resistant layer disposed radially outward of the first insulator at the high temperature segment and the binding material at the transition segment. The electrical harness may include a crimped structure disposed radially outward of the second chafe resistant layer at the transition segment. The electrical harness may include a clamp disposed radially outward of the crimped structure. The conductor may include a plurality of a conductive wires, wherein the conductive wires may be twisted, and a second insulator disposed radially outward of the conductive wires. The first insulator may be disposed radially outward of the first chafe resistant layer at the transition segment. The first insulator may be a fiberglass material. The first chafe resistant layer may be a polyetheretherketone or meta-aramid material. The second chafe resistant layer may be a stainless steel braid. The binding material may be a self-amalgamating rubber material.

According to various embodiments, a turbine engine is disclosed. The turbine engine may include an electrical harness. The electrical harness may include a high temperature segment, a low temperature segment, and a transition segment between the high temperature segment and the low temperature segment. The electrical harness may include a conductor disposed within the electrical harness that continuously spans the high temperature segment, the transition segment, and the low temperature segment. The electrical harness may include a first insulator disposed radially outward of the conductor at the high temperature segment and the transition segment. The electrical harness may include a first chafe resistant layer disposed radially outward of the conductor at the low temperature segment and the transition segment. The electrical harness may include a binding material disposed radially outward of the first insulator and first chafe resistant layer at the transition segment.

According to various embodiments, the turbine engine may include a second chafe resistant layer disposed radially outward of the first insulator at the high temperature segment and the binding material at the transition segment. The turbine engine may include a crimped structure disposed radially outward of the second chafe resistant layer at the transition segment. The turbine engine may include a clamp disposed radially outward of the crimped structure. The clamp may be a plastically deformable material and may be integral with crimped structure. The conductor may include a plurality of a conductive wires, wherein the conductive wires are twisted, and a second insulator disposed radially outward of the conductive wires. The first insulator may be disposed radially outward of the first chafe resistant layer at the transition segment. The first insulator may be a fiberglass material. The first chafe resistant layer may be a polyetheretherketone or meta-aramid material, wherein the second chafe resistant layer may be a stainless steel braid, and wherein the binding material may be a self-amalgamating rubber material.

According to various embodiments, a method of manufacturing an electrical harness is disclosed. The method may include disposing a first insulator radially outward of a conductor at a high temperature segment of the electrical harness. The method may include disposing a first chafe resistant layer radially outward of the conductor at a low temperature segment of the electrical harness. The method may include disposing a binding material radially outward of the first insulator and first chafe resistant layer. The method may include disposing a second chafe resistant layer radially outward of the first insulator and the binding material. The method may include crimping a crimped structure radially outward of the second chafe resistant layer. The method may include attaching a clamp radially outward the crimped structure. The method may include attaching the clamp to a portion of a turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 4 illustrates a flow diagram of a process for manufacturing an electrical harness in accordance with carious embodiments.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Figure 1:
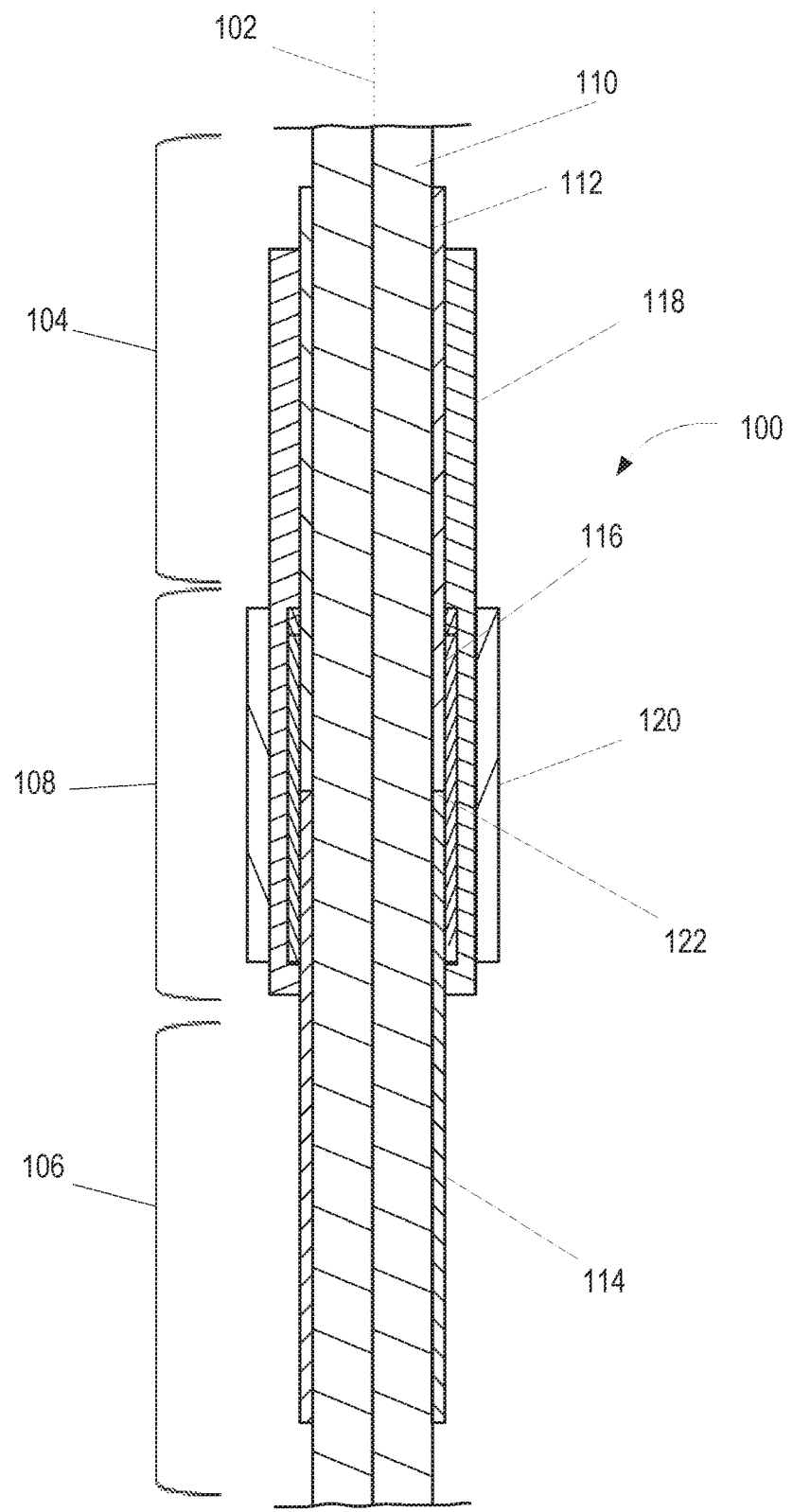
FIG. 1 illustrates a cross section of an electrical harness in accordance with various embodiments.

In various embodiments and with reference to FIG. 1, a cross section of electrical harness 100 is provided. Electrical harness 100 may extend radially about axis 102. Electrical harness 100 may comprise high temperature segment 104, low temperature segment 106, transition segment 108. Transition segment 108 may be between the high temperature segment 104 and the low temperature segment 106. High temperature segment 104 may correspond to portions of electrical harness 100 that are intended to be disposed in environments that may reach from about 500° F. (260° C.) to about 1100° F. (593° C.) wherein the term about in this context only means+/−18° F. (10° C.). Low temperature segment 106 may correspond to portions of electrical harness 100 that are intended to be disposed in environments that may reach from about 500° F. (260° C.) and below, wherein the term about in this context only means+/−18° F. (10° C.). Transition segment may comprise the axial length of crimping structure 120.

Electrical harness 100 may comprise conductor 110. Conductor 110 may be disposed within electrical harness 100 and may span across a portion of the high temperature segment 104, the transition segment 108, and a portion of the low temperature segment 106.

In various embodiments, at high temperature segment 104 of electrical harness 100, first insulator 112 may be disposed radially outward of conductor 110. First insulator 112 may comprise a fiberglass material. In various embodiments, at low temperature segment 106 of electrical harness 100, first chafe resistant layer 114 may be disposed radially outward of conductor 110. First chafe resistant layer 114 may comprise a meta-aramid material or a polyetheretherketone material. First chafe resistant layer 114 may prevent chafing of various components in electrical harness 100.

In various embodiments, at transition segment 108 may comprise junction point 122. In various embodiments, at junction point 122 of transition segment 108, there may be a gap of a small distance between first insulator 112 and first chafe resistant layer 114. In various embodiments, at junction point 122 of transition segment 108, first insulator 112 may abut first chafe resistant layer 114. In various embodiments, at junction point 122 of transition segment 108, first insulator 112 may overlap first chafe resistant layer 114 a small axial distance.

In various embodiments, binding material 116 may be disposed radially outward of first insulator 112 at the transition segment 108. In various embodiments, binding material 116 may be disposed radially outward of first chafe resistant layer 114 at the transition segment 108. In various embodiments, binding material 116 may be disposed radially outward of first insulator 112 and first chafe resistant layer 114 at the transition segment 108. Binding material 116 may be, for example, rubber self-amalgamating tape, rubber tape, synthetic rubber tape, and other suitable materials.

In various embodiments, second chafe resistant layer 118 may be disposed radially outward of first insulator 112 at high temperature segment 104 of electrical harness 100. In various embodiments, second chafe resistant layer 118 may be disposed radially outward of first insulator 112 and binding material 116 at transition segment 108 of electrical harness 100. Second chafe resistant layer 118 may comprise a stainless steel braid that is braided in any suitable way. Second chafe resistant layer 118 may provide some level of electromagnetic interference shielding and thermal protection.

In various embodiments, crimped structure 120 may be disposed radially outward of second chafe resistant layer 118. Crimped structure 120 may be crimped, compressed, or otherwise mechanically deformed into place, and the resulting compressive load from the crimped structure 120 may hold conductor 110, first insulator 112, first chafe resistant layer 114, binding material 116, and second chafe resistant layer 118 in place with respect to one another. Crimped structure 120 may be cylinder or may be non-cylindrical and may have an annular cross section. Crimped structure 120 may comprise a plastically deformable material such that the crimped structure may be crimped in accordance with various embodiments.

Figure 2:
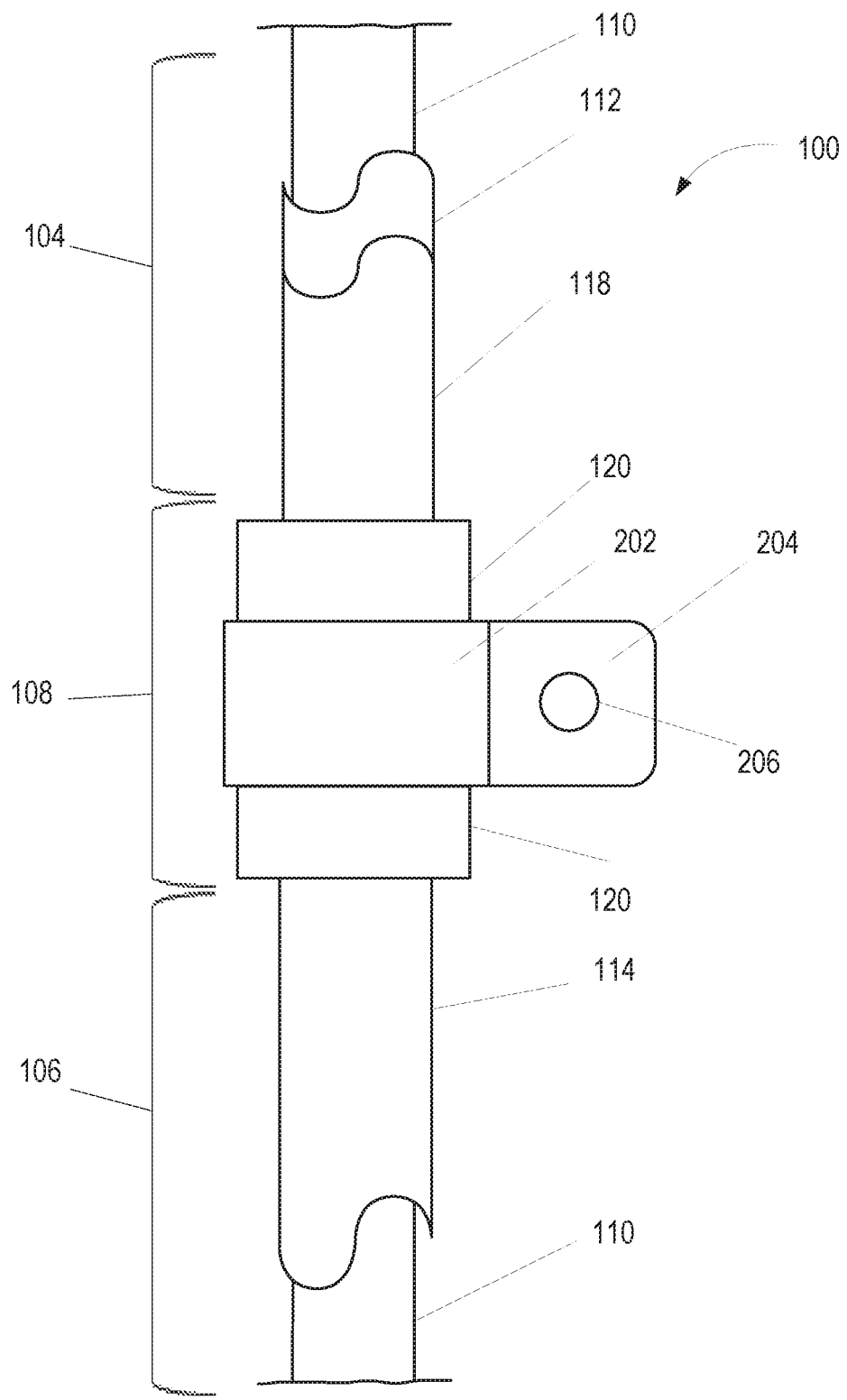
FIG. 2 illustrates an electrical harness in accordance with various embodiments.

In various embodiments and with reference to FIG. 2, an electrical harness 100 is provided. Clamp 202 may be disposed radially outward of crimped structure 120. Clamp 202 may comprise ground portion 204. Ground portion 204 may comprise aperture 206. Ground portion 204 may be configured to selectively attach to a portion of a turbine engine for both mechanical stability as well as to act as an electrical ground. Clamp 202 may comprise a plastically deformable material and may be integral with crimped structure 120.

Figure 3:
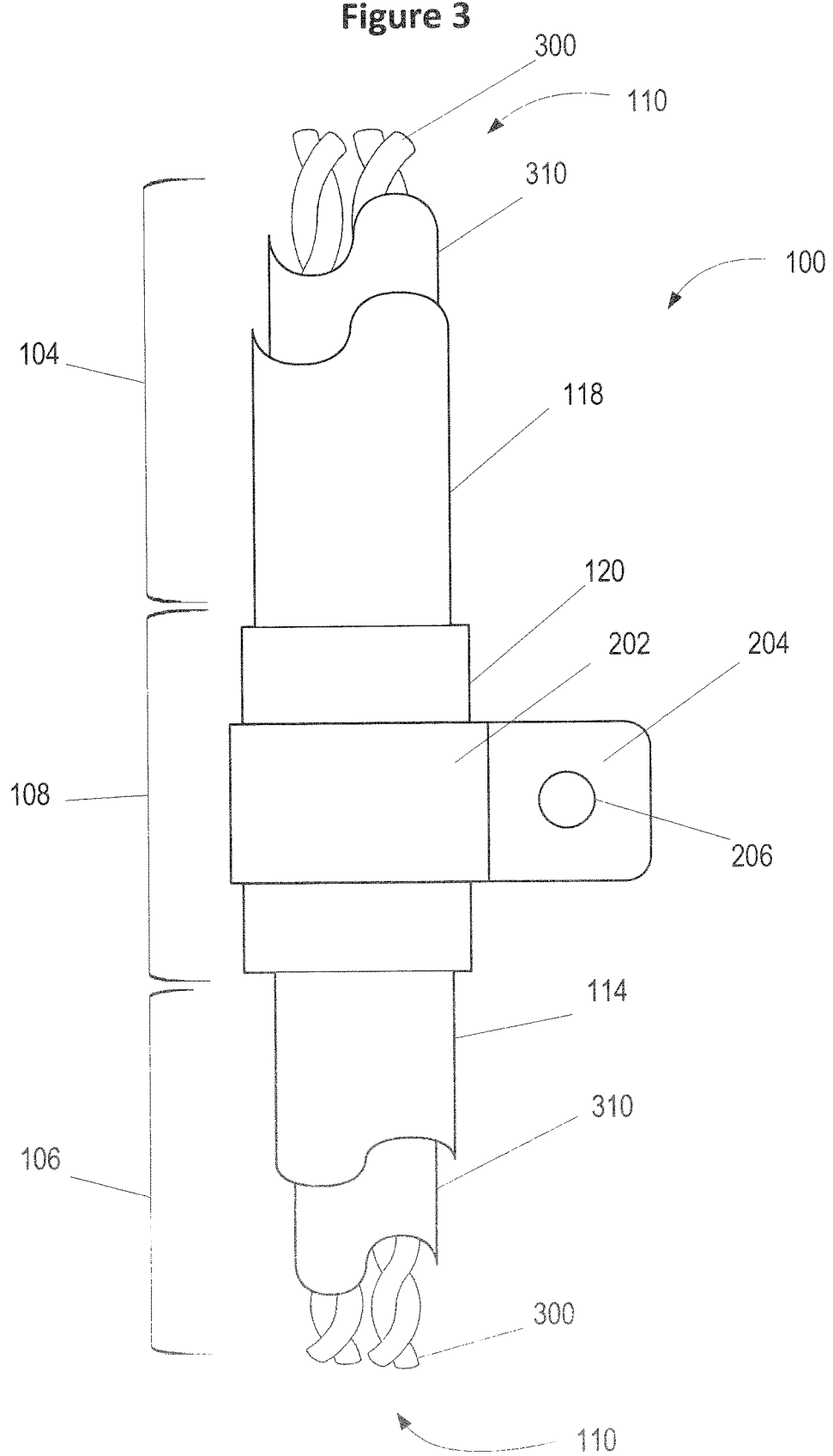
FIG. 3 illustrates an electrical harness in accordance with various embodiments.

In various embodiments and with reference to FIG. 3, an electrical harness is provided. Conductor 110 may comprise a plurality of conductive wires 300, for example, made of copper. Conductive wires 300 may comprise pairs, triplets, or other multiples of wires. The conductive wire pairs, triplets, etc., may be in contact with one another or may each be radially disposed by a second insulator 310. The multiples of conductive wires 300 may be twisted before or after the third insulator, stainless steel material, or PTFE material are radially disposed, for example, with X number of twists per running inch. Conductor 110 may be an inch (2.54 cm) or more in diameter based on the number of conductive wires 300 present. In various embodiments, conductor 110 may comprise an optical cable or a coaxial cable. Second insulator 310 may be a material made similar to the first insulator or a suitable material for the temperature application. A stainless steel material may radially dispose the conductive wires or the second insulator. The stainless steel material may be braided and may protect the conductor 110 from electromagnetic interference from other sources. A Polytetrafluoroethylene (PTFE) material may radially dispose the conductive wires, third insulator, or the stainless steel material. The PTFE material may be extruded. Electrical harness 100 may branch into separate components. The branches may be y or t-shaped.

In various embodiments and with reference to FIG. 4, a flow diagram of a process 400 for manufacturing an electrical harness is illustrated. A first insulator may be disposed radially outward of a conductor at a high temperature segment of the electrical harness (step 410). The high temperature segment may comprise any portion of the electrical harness that is 500° F. (260° C.) to about 1100° F. (593° C.) wherein the term about in this context only means+/−18° F. (10° C.). A first chafe resistant layer may also be disposed radially outward of the conductor at a low temperature segment of the electrical harness. The low temperature segment may comprise any portion of the electrical harness that is 500° F. (260° C.) and below, wherein the term about in this context only means+/−18° F. (10° C.). A binding material may be disposed radially outward of the first insulator and the first chafe resistant layer (step 420). A second chafe resistant layer may be disposed radially outward of the first insulator and the binding material (step 430). A crimped structure may be crimped radially outward of the second chafe resistant layer (step 440). A clamp may be attached radially outward of the crimped structure (step 450). The clamp may be attached to a portion of a turbine engine (step 460). The clamp may comprise a plastically deformable material and may be integral with the crimped structure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrical harness comprising,
a high temperature segment, a low temperature segment, and a transition segment disposed between the high temperature segment and the low temperature segment;
a conductor disposed within the electrical harness, wherein the conductor continuously spans the high temperature segment, the transition segment, and the low temperature segment;
a first insulator disposed radially outward of the conductor at the high temperature segment and the transition segment;
a first chafe resistant layer disposed radially outward of the conductor at the low temperature segment and the transition segment;
a binding material disposed radially outward of the first insulator and the first chafe resistant layer at the transition segment;
a second chafe resistant layer disposed radially outward of the first insulator at the high temperature segment and the binding material at the transition segment; and
a crimped structure disposed radially outward of the second chafe resistant layer at the transition segment.

2. The electrical harness of claim 1, further comprising a clamp disposed radially outward of the crimped structure.

3. The electrical harness of claim 1, wherein the conductor comprises:
a plurality of conductive wires, wherein the conductive wires are twisted; and
a second insulator disposed radially outward of the conductive wires.

4. The electrical harness of claim 1, wherein the first insulator comprises a fiberglass material.

5. The electrical harness of claim 4, wherein the first chafe resistant layer comprises a polyetheretherketone or meta-aramid material.

6. The electrical harness of claim 5, wherein the second chafe resistant layer comprises a stainless steel braid.

7. The electrical harness of claim 6, wherein the binding material comprises a self-amalgamating rubber material.

8. A gas turbine engine comprising:
an electrical harness, wherein the electrical harness comprises:

a high temperature segment, a low temperature segment, and a transition segment between the high temperature segment and the low temperature segment;

a conductor disposed within the electrical harness, wherein the conductor continuously spans the high temperature segment, the transition segment, and the low temperature segment;

a first insulator disposed radially outward of the conductor at the high temperature segment and the transition segment;

a first chafe resistant layer disposed radially outward of the conductor at the low temperature segment and the transition segment;

a binding material disposed radially outward of the first insulator and the first chafe resistant layer at the transition segment;

a second chafe resistant layer disposed radially outward of the first insulator at the high temperature segment and the binding material at the transition segment; and a crimped structure disposed radially outward of the second chafe resistant layer at the transition segment.

9. The gas turbine engine of claim 8, further comprising a clamp disposed radially outward of the crimped structure.

10. The gas turbine engine of claim 8, wherein the conductor comprises:

a plurality of conductive wires, wherein the conductive wires are twisted;

a second insulator disposed radially outward of the conductive wires.

11. The gas turbine engine of claim 8, wherein the first insulator comprises a fiberglass material, wherein the first chafe resistant layer comprises a polyetheretherketone or meta-aramid material, wherein the second chafe resistant layer comprises a stainless steel braid, and wherein the binding material comprises a self-amalgamating rubber material.

12. A method of manufacturing an electrical harness, the method comprising:

disposing a first insulator radially outward of a conductor at a high temperature segment of the electrical harness;

disposing a first chafe resistant layer radially outward of the conductor at a low temperature segment of the electrical harness;

disposing a binding material radially outward of the first insulator and the first chafe resistant layer;

disposing a second chafe resistant layer radially outward of the first insulator and the binding material; and crimping a crimped structure radially outward of the second chafe resistant layer.

13. The method of claim 12, further comprising attaching a clamp radially outward the crimped structure.

14. The method of claim 13, further comprising attaching the clamp to a portion of a gas turbine engine.

* * * * *